(12) United States Patent
Fischer et al.

(10) Patent No.: US 7,826,824 B2
(45) Date of Patent: Nov. 2, 2010

(54) METHOD OF PROTECTING THE INTEGRITY OF MESSAGES SENT IN A MOBILE RADIO SYSTEM

(75) Inventors: Patrick Fischer, Chaville (FR); Hiroyo Masuda, Ryugasaki (JP)

(73) Assignee: Evolium S.A.S., Paris (FR)

( * ) Notice: Subject to any disclaimer, the term of this patent is extended or adjusted under 35 U.S.C. 154(b) by 1182 days.

(21) Appl. No.: 10/637,578

(22) Filed: Aug. 11, 2003

(65) Prior Publication Data

US 2004/0137876 A1  Jul. 15, 2004

(30) Foreign Application Priority Data

Aug. 12, 2002  (FR) .................................. 02 10240

(51) Int. Cl.
*H04M 1/66* (2006.01)
(52) U.S. Cl. .................. 455/410; 455/411; 455/435.1; 455/422.1; 380/270
(58) Field of Classification Search ................ 713/150, 713/170; 455/410, 411, 435.1; 380/270; 370/389, 272
See application file for complete search history.

(56) References Cited

U.S. PATENT DOCUMENTS

| | | | |
|---|---|---|---|
| 6,587,680 B1 * | 7/2003 | Ala-Laurila et al. | .......... 455/411 |
| 2002/0044552 A1 * | 4/2002 | Vialen et al. | .......... 370/389 |
| 2002/0066011 A1 * | 5/2002 | Vialen et al. | .......... 713/150 |
| 2002/0114469 A1 * | 8/2002 | Faccin et al. | .......... 380/270 |
| 2003/0100291 A1 * | 5/2003 | Krishnarajah et al. | ....... 455/410 |

FOREIGN PATENT DOCUMENTS

| | | |
|---|---|---|
| WO | WO 0139534 A1 | 5/2001 |
| WO | WO 0163954 A1 | 8/2001 |

OTHER PUBLICATIONS

ETSI: "Universal Mobile Telecommunications System (UMTS); 3G security; Security architecture (EGPP TS 33.102 version 5.0.0 Release 5)" ETSI TS 133 102 V5.0.0, Jun. 2002, pp. 1-62, XP002238243.
ETSI: "Universal Telecommunications System (UMTS); Radio Resource Control (RCC) protocol specification (3GPP TS 25.331 version 5.1.0 Release 5)", ETSI TS 125 331 V5.1.0, Jun. 2002, pp. 204-219, XP002238244.

* cited by examiner

*Primary Examiner*—Charles N Appiah
*Assistant Examiner*—Randy Peaches
(74) *Attorney, Agent, or Firm*—Sughrue Mion, PLLC

(57) ABSTRACT

The present invention provides a method of protecting the integrity of messages sent between a mobile terminal and a server radio access network controller in a mobile radio system, in which method a message sent is protected by a code calculated on sending and, in the event of a change of server radio access network controller from a source controller to a target controller, a message sent to the mobile terminal by the source controller, for forwarding to the mobile terminal information created in the target controller and then transferred by the target controller to the source controller, is protected by a code calculated in the target controller.

38 Claims, 4 Drawing Sheets

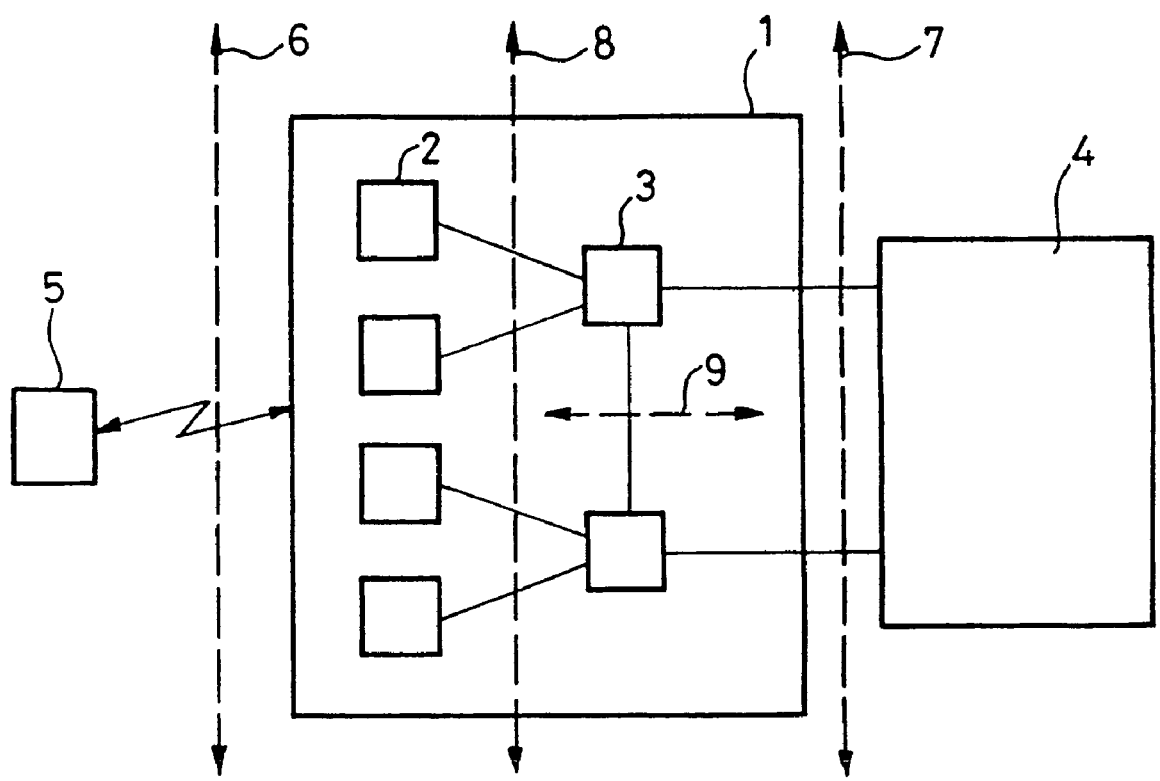
FIG_1

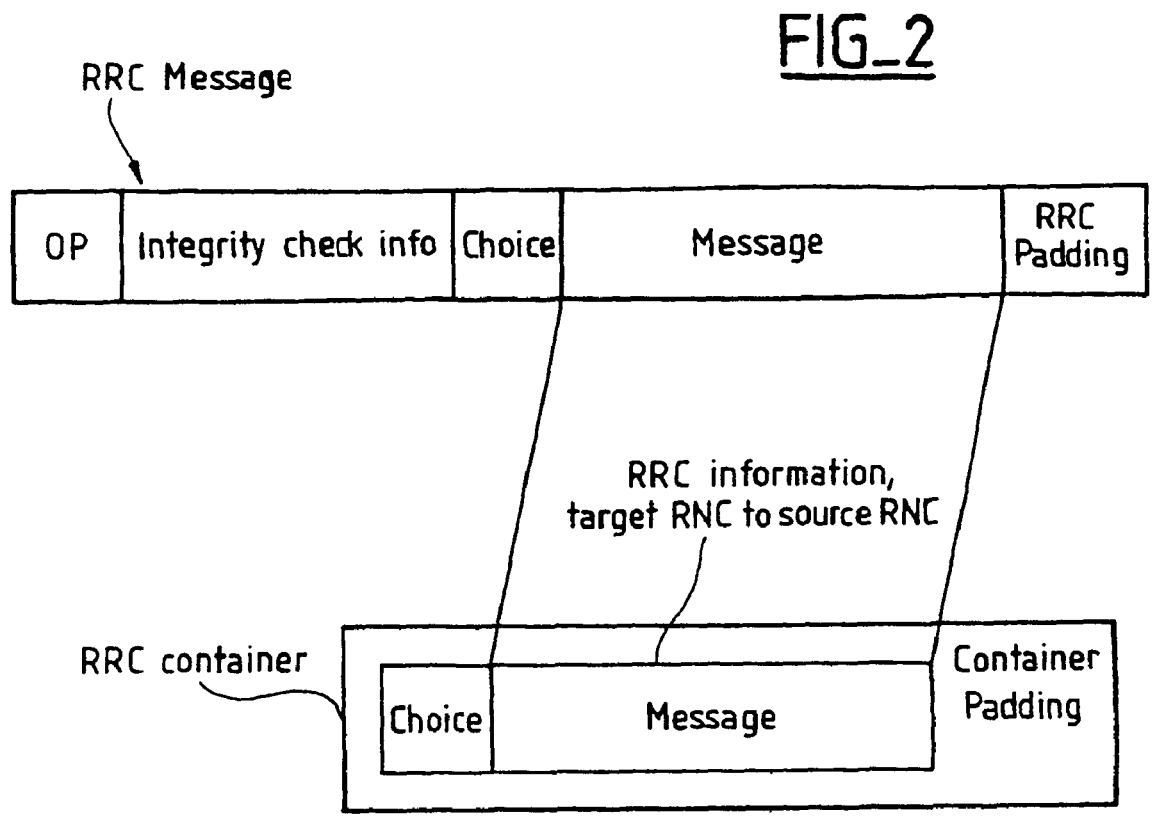

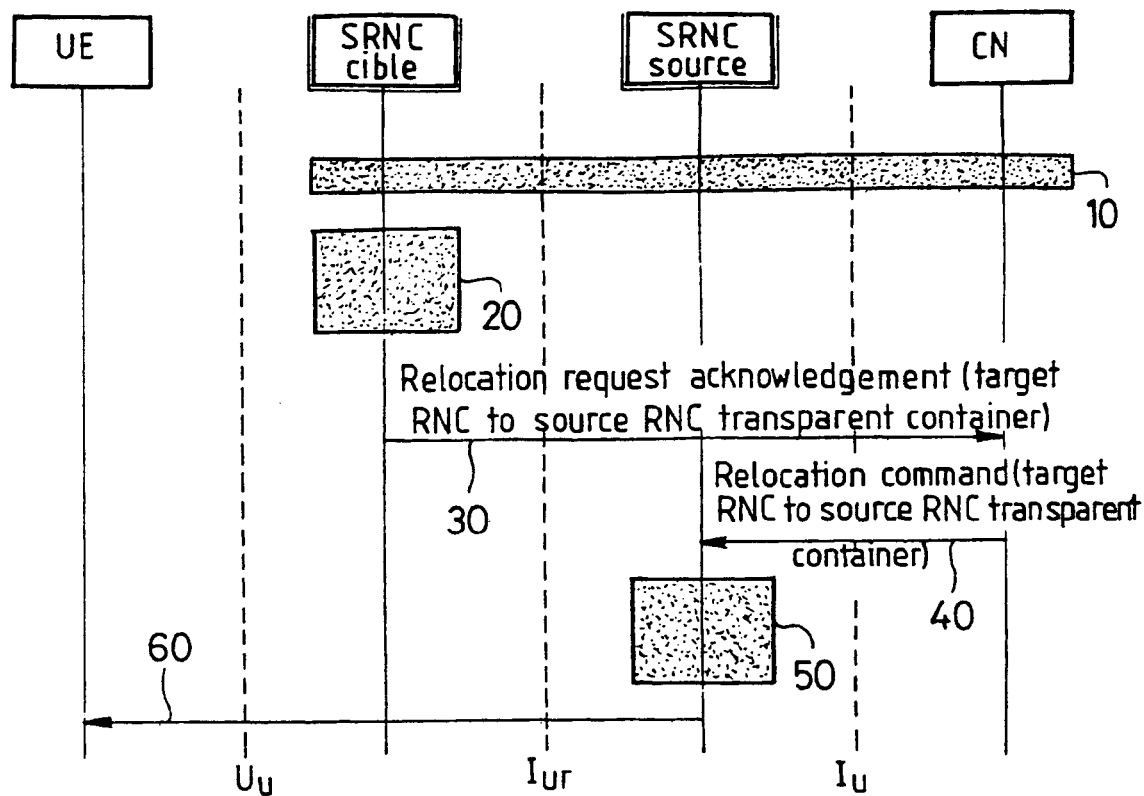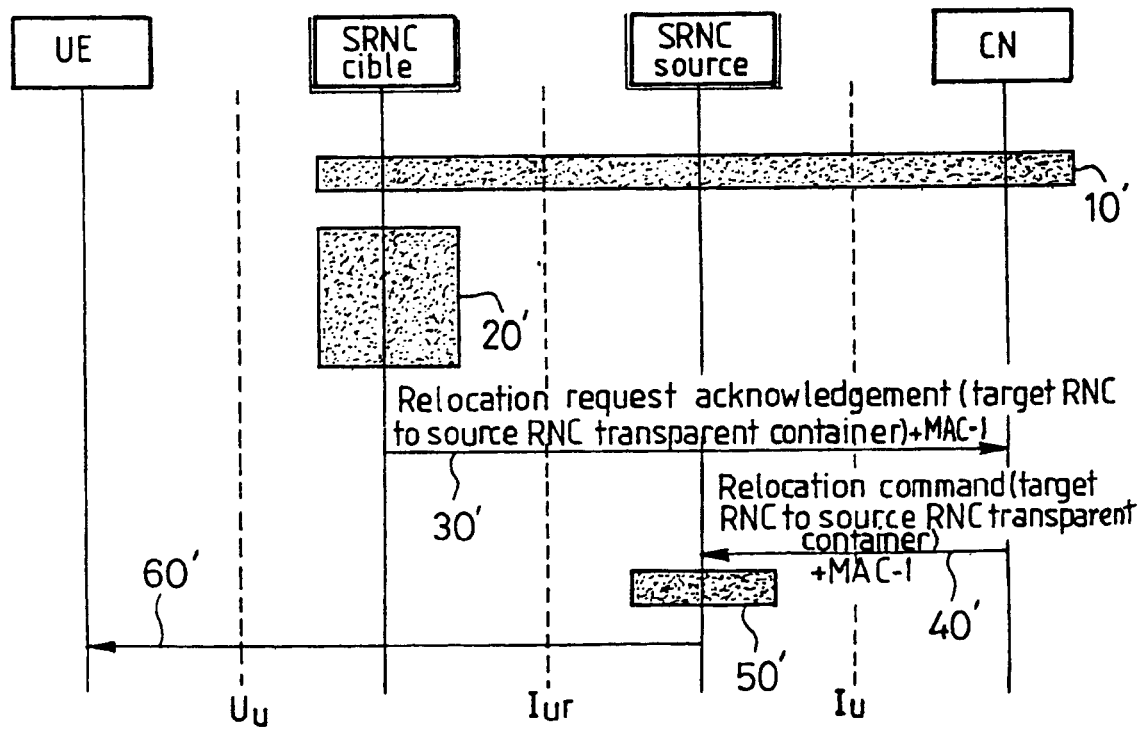

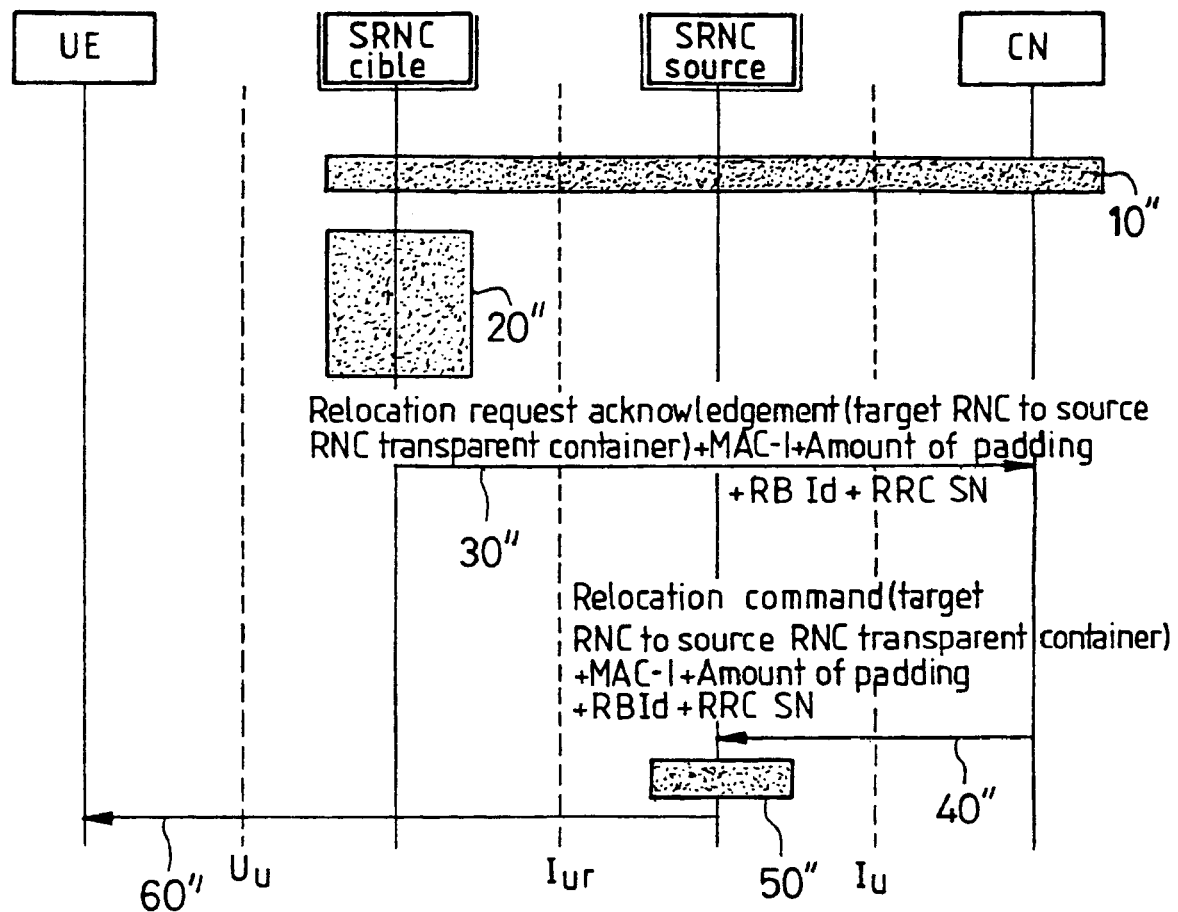

METHOD OF PROTECTING THE INTEGRITY OF MESSAGES SENT IN A MOBILE RADIO SYSTEM

The present invention relates generally to mobile radio systems.

The present invention is particularly applicable to third generation mobile radio systems, in particular the Universal Mobile Telecommunication System (UMTS).

BACKGROUND OF THE INVENTION

Generally speaking, mobile radio systems are covered by standards and more information can be obtained from the corresponding standards published by the corresponding standards organizations.

FIG. 1 outlines the general architecture of mobile radio systems, essentially including:

a radio access network (RAN) 1, and a core network (CN) 4.

The RAN is made up of base stations 2 and base station controllers 3 and communicates with mobile terminals 5 via a radio interface 6 and with the CN 4 via an interface 7. Within the RAN, the base stations communicate with the base station controllers via an interface 8.

In the UMTS, the RAN is called the UMTS terrestrial radio access network (UTRAN), a base station is called a Node B, the base station controllers are called radio network controllers (RNC), and a mobile terminal is called a user equipment (UE). The radio interface 6 is called the Uu interface, the interface 7 is called the Iu interface, the interface 8 is called the Iub interface, and an interface 9, called the Iur interface, can also be provided between RNCs.

The RNC controlling a given Node B is called the controlling radio network controller (CRNC). The CRNC has a load control and radio resource allocation role in respect of each Node B that it controls. For a given call relating to a given UE, there is an RNC called the serving radio network controller (SRNC) having a control role for the call concerned. In the case of macro-diversity transmission (also called soft handover), a Node B connected to the UE but not controlled by the SRNC communicates with the SRNC via the RNC controlling it, called the drift RNC (DRNC), via the Iur interface.

In the UMTS in particular there is an integrity protection function for protecting the integrity of specific information sent via the radio interface, namely signaling information exchanged in the context of mobility management, call management, session management, etc. protocols. This information is transmitted via the radio interface in messages called radio resource control (RRC) messages defined in the SRNC/UE signaling protocol, which is called the RRC protocol.

For a description of the RRC protocol and the integrity protection function, see in particular specifications 3G TS 25.331 and 3G TS 33.102 published by the 3$^{rd}$ Generation Partnership Project (3GPP). There follows a brief summary of the mechanisms used to protect the integrity of messages exchanged between a sender (a UE in the uplink direction or an SRNC in the downlink direction) and a receiver (an SRNC in the uplink direction or a UE in the downlink direction):

for each message to be sent, the sender calculates a message authentication code (MAC-I code) using an integrity protection algorithm called the UMTS integrity algorithm (UIA) and input parameters of that algorithm, after which the sender inserts the MAC-I code calculated in this way into the message to be sent, for each message received, the receiver recalculates the MAC-I code using the same algorithm and the same input parameters as the sender, after which the receiver compares the code recalculated in this way with the code received; if the two codes match, the receiver considers that the message received is intact and was sent by that particular sender.

The algorithm input parameters include a secret parameter and public parameters. The secret parameter is called the integrity key (IK). The public parameters include:

a pseudo-random value (corresponding to a parameter FRESH), a sequence number (corresponding to a parameter COUNT-I), the message to be sent (corresponding to a parameter MESSAGE), and the identity of the radio bearer (RB) on which the message is sent (corresponding to a parameter RB Id).

The sequence number COUNT-I includes an RRC sequence number (RRC SN) and an RRC hyperframe number (RRC HFN).

Standardized message formats are used at open interfaces such as the Uu interface for RRC messages in particular. Accordingly, a sequence of bits to be sent is obtained from various information elements (IE) to be sent in a message, in accordance with coding rules conforming to an abstract syntax, for example the Abstract Syntax Notation 1 (ASN.1) syntax, which is used to define a data structure for the information to be sent, and a transfer syntax, such that data received in the form of a stream of octets or bits is correctly recognized on reception. For more details of this coding, for example for sending RRC messages at the Uu interface, see in particular the specification 3G TS 25.331.

As shown in FIG. 2, the RRC message bit sequence corresponding to an RRC message sent at the Uu interface includes:

a bit OP indicating whether the integrity of the message is protected, if the integrity of the message is protected, an integrity check info bit sequence corresponding to an IE called the integrity check info, choice bits enabling the receiver to determine which of the various RRC messages to be sent is sent in this instance, a sequence of payload bits (denoted "message") corresponding to payload information elements IE, and where applicable, RRC padding bits to make the total length of the sequence sent a multiple of eight bits.

The integrity check info IE contains:

a message authentication code IE which corresponds to the MAC-I code calculated on sending, and an RRC message sequence number IE which corresponds to the RRC SN used on sending the message in question.

The RRC SN is incremented for each protected message sent and the RRC message sequence number IE is used in the receiver, in particular to update the RRC HFN on each new RRC SN cycle.

Procedures are provided whereby the network communicates to the UE parameters for calculating the MAC-I code (including in particular the algorithm type and the pseudo-random value FRESH).

During a call, the SRNC role for the call can be transferred from a source SRNC to a target SRNC for various reasons, for example: optimizing the transfer time, optimizing resource allocation, optimizing the relative loads of the various RNCs, etc. This kind of transfer is effected in accordance with a relocation procedure.

There are two types of relocation:
relocation in which the UE is not involved, typically corresponding to a situation in which the target SRNC previously had a DRNC role, and
relocation in which the UE is involved, typically corresponding to a situation in which the target SRNC did not previously have a DRNC role.

In the event of a relocation in which the UE is involved, procedures are provided whereby the network communicates to the UE, when it is still under the control of the source SRNC, various parameters to be used when it is under the control of the target SRNC, such as parameters relating to new radio resources to be used, and if necessary new parameters for calculating the MAC-I code (for example a new pseudo-random value FRESH and possibly a new algorithm type).

FIG. 3 shows procedures of the above kind from the current version of the standard.

A step 10 indicates that a relocation procedure has begun. The relocation procedure includes exchanges of signaling between the source SRNC, the target SRNC, the CN and the UE, as defined in particular in the specifications 3G TS 25.413 and 3G TS 25.331 published by the 3GPP. The specification 3G TS 25.413 relates to the Radio Access Network Application Part (RANAP) signaling protocol that applies at the Iu interface. As previously indicated, the specification 3G TS 25.331 relates to the Radio Resource Control (RRC) signaling protocol that applies at the Uu interface.

In a step 20 the target SRNC creates information called RRC information. The corresponding information unit created by the target SRNC is called the RRC information, target RNC to source RNC information unit; it is referred to more simply hereinafter as the RRC information unit. An RRC information unit is intended to be sent in messages other than messages at the Uu interface, for example messages at the Iu interface, or RANAP messages, for example the RELOCATION REQUEST ACKNOWLEDGE and RELOCATION COMMAND messages. These RANAP messages contain an IE corresponding to an information container called the target RNC to source RNC transparent container, which itself contains an IE corresponding to an information container called the RRC container, which in turn contains the RRC information, target RNC to source RNC information unit. RRC information created by the target SRNC is thus transferred to the source SRNC, which forwards it to the UE in an RRC message at the Uu interface. The RRC message can be one of the following messages, for example: RADIO BEARER SETUP, RADIO BEARER RECONFIGURATION, RADIO BEARER RELEASE, TRANSPORT CHANNEL RECONFIGURATION, PHYSICAL CHANNEL RECONFIGURATION.

The RRC information unit created by the target SRNC includes an integrity protection mode info IE which can in turn include MAC-I code calculation parameters (such as the algorithm type and the pseudo-random value FRESH).

Coding based on the ASN.1 syntax is also used and as a result of this coding (see FIG. 2):
an RRC information, target RNC to source RNC bit sequence, corresponding to a RRC information, target RNC to source RNC information unit, contains:
choice bits enabling the receiver to determine which of the corresponding eligible RRC messages is sent in this instance,
a message bit sequence corresponding to payload information elements, an RRC container bit sequence contains:
a bit sequence corresponding to the RRC information, target RNC to source RNC sequence,
where applicable container padding bits, so that the number of bits in the RRC container sequence (defined, in accordance with the coding rules used, as an OCTET STRING) is a multiple of eight bits.

In a step 30 the target SRNC sends the CN a RELOCATION REQUEST ACKNOWLEDGE message, which includes a target RNC to source RNC transparent container IE in turn containing an RRC container. The RRC container in turn includes an RRC information unit created in step 20.

In a step 40 the CN sends the source SRNC a RELOCATION COMMAND message which contains the target RNC to source RNC transparent container IE received by the CN of the target SRNC.

Thus in steps 30 and 40 the RRC information unit created in step 20 is transferred transparently from the target SRNC to the source SRNC via the core network.

In a step 50 the source SRNC decodes the RRC information unit received, in particular to verify if new MAC-I code calculation parameters have been sent. On the basis of the MAC-I code calculation parameters, the source SRNC calculates the MAC-I code to be inserted into the message to protect its integrity when sending it to the UE at the Uu interface.

As shown in FIG. 2, with the current version of the standard the message sequence of the coded RRC information unit corresponds to the message sequence of a coded RRC message and consequently the source SRNC must calculate the MAC-I code in order to construct the integrity check info sequence of the coded RRC message. In step 50, after the MAC-I code has been calculated in this way, the source SRNC constructs the sequence of bits corresponding to the coded RRC message to be sent to the UE at the Uu interface (see FIG. 2).

In a step 60 the source SRNC sends the RRC message obtained in this way to the UE.

The applicant has noted that a method of the above kind has the following drawbacks, for example:
it is necessary for the source SRNC to decode the RRC information unit to verify the MAC-I code calculation parameters and then to calculate the MAC-I code on the basis of those parameters, which has the drawback that this increases the quantity and complexity of processing in the source SRNC,
it is necessary for the source SRNC to be able to implement the type of algorithm chosen by the target SRNC, or the target SRNC cannot choose a type of algorithm other than that implemented in the source SRNC; in other words, this has the drawback of either relatively severe constraints or a lack of flexibility, and
to transfer RRC information in RANAP messages, it is necessary for the target SRNC to use a format known to the source SRNC, or the target SRNC cannot choose a format other than that known to the source SRNC; in other words, this has the further drawback of either relatively severe constraints or a lack of flexibility (for example in the situation in which a new protocol version has been specified and one of the two SRNCs is using the new version and the other one is using the old version).

In other words, with the current version of the standard, a number of conditions must be satisfied between the source SRNC and the target SRNC:
the source SRNC must be able to decode all messages that the target SRNC may send via the CN, the source SRNC must know all the optional extensions that the target SRNC may include in the message, the source SRNC must support a message version that the target SRNC is using, and the source SRNC must support the integrity protection mechanism that the target SRNC has chosen.

OBJECTS AND SUMMARY OF THE INVENTION

A particular object of the present invention is to avoid some or all of the above drawbacks. More generally, an object of the present invention is to optimize the use of integrity protection procedures in the above systems, in particular in a relocation in which the UE is involved.

The present invention firstly provides a method of protecting the integrity of messages sent between a mobile terminal and a server radio access network controller in a mobile radio system, in which method a message sent is protected by a code calculated on sending and, in the event of a change of server radio access network controller from a source controller to a target controller, a message sent to the mobile terminal by the source controller, for forwarding to the mobile terminal information created in the target controller and then transferred by the target controller to the source controller, is protected by a code calculated in the target controller.

According to another feature, additional information is created in the target controller and then transferred from the target controller to the source controller.

According to another feature, said additional information includes additional information relating to the code calculated by the target controller.

According to another feature, said additional information includes additional information intended to ensure that operations of message construction by the source controller and of code calculation by the target controller are mutually consistent.

According to another feature, said additional information includes additional information intended to enable the source controller to determine the size of a sequence of bits received from the target controller and corresponding to said information created by the target controller.

According to another feature, said additional information indicates the amount of padding needed to transfer said sequence of bits in an information container of given size.

According to another feature, said additional information includes additional information intended to ensure that the identity of the radio bearer used by the target controller to calculate said code matches the identity of the radio bearer used by the source controller to send said message to the mobile terminal.

According to another feature, said additional information includes additional information intended to ensure that a sequence number contained in the message sent to the mobile terminal matches the sequence number used by the target controller to calculate said code.

According to another feature, said additional information is transferred from the target controller to the source controller in the same information unit as said information created by the target controller.

According to another feature, said additional information is transferred from the target controller to the source controller in a first information container including said information unit.

According to another feature, said additional information is transferred from the target controller to the source controller in a second information container including said first information container.

According to another feature, said additional information is transferred from the target controller to the source controller in a message sent between the target controller and the core network and then in a message sent between the core network and the source controller, said messages including said second information container.

According to another feature, said message sent from the source controller to the mobile terminal is a radio resource control (RRC) message.

According to another feature, said information unit is an RRC information, target RNC to source RNC information unit.

According to another feature, said first information container is an RRC information container.

According to another feature, said second information container is a target RNC to source RNC transparent information container.

According to another feature, said messages including said second information container are radio access network application part (RANAP) messages.

According to another feature, said information communicates to the mobile terminal parameters to be used under the control of the target controller.

According to another feature, said RRC message is one of the following messages: RADIO BEARER SETUP, RADIO BEAR RECONFIGURATION, RADIO BEARER RELEASE, TRANSPORT CHANNEL RECONFIGURATION, PHYSICAL CHANNEL RECONFIGURATION.

According to another feature, said RANAP message sent between the target controller and the core network is a RELOCATION REQUEST ACKNOWLEDGE message.

According to another feature, said RANAP message sent between the core network and the source controller is a RELOCATION COMMAND message.

According to another feature, said code is a MAC-I message authentication code.

According to another feature, in the event of change of server radio access network controller from said source controller to said target controller, information created in the source controller is transferred to the target controller and additional information is created in the source controller and then transferred from the source controller to the target controller.

According to another feature, said additional information created in the source controller includes additional information to ensure that the identity of the radio bearer used by the target controller to calculate said code matches the identity of the radio bearer used by the source controller to send said message to the mobile terminal.

According to another feature, said additional information is transferred from the source controller to the target controller in the same information unit as said information created by the source controller.

According to another feature, said additional information is transferred from the source controller to the target controller in a first information container including said information unit.

According to another feature, said additional information is transferred from the source controller to the target controller in a second information container including said first information container.

According to another feature, said additional information is transferred from the source controller to the target controller in a message sent between the source controller and the core network and then in a message sent between the core network and the target controller, said messages including said second information container.

According to another feature, said information unit is an SRNS relocation information unit.

According to another feature, said first information container is an RRC container.

According to another feature, said second information container is a source RNC to target RNC transparent container.

According to another feature, said messages including said second information container are radio access network application part (RANAP) messages.

According to another feature, said RANAP message sent between the source controller and the core network is a RELOCATION REQUIRED message.

According to another feature, said RANAP message sent between the core network and the target controller is a RELOCATION REQUEST message.

The present invention also provides, in addition to the above method, a radio access network, a mobile terminal, and a mobile radio system, all including means for implementing the above method.

BRIEF DESCRIPTION OF THE DRAWINGS

Other aspects and features of the present invention will become apparent on reading the following description of embodiments of the invention, which is given with reference to the accompanying drawings, in which:

FIG. 1 shows the general architecture of a mobile radio system, in particular the UMTS, FIG. 2 shows various data structures transferred in the system shown in FIG. 1, FIG. 3 shows a prior art method of protecting the integrity of messages sent in the event of a relocation in which the UE is involved, FIG. 4 shows one example of a method according to the invention, and FIG. 5 shows another example of a method according to the invention.

MORE DETAILED DESCRIPTION

FIG. 4 shows one example of a method according to the invention, corresponding in particular and by way of example to a relocation in which the UE is involved, like FIG. 3 previously described.

A step 10' indicates that a relocation procedure has begun.

In a step 20', the target SRNC creates RRC information. The resulting RRC information unit created by the target controller includes additional information, explained next, over and above the information created in step 20 in FIG. 2.

In step 20' the target SRNC calculates the MAC-I code. Generally speaking, to calculate the MAC-I code, the target SRNC can use calculation parameters such as calculation parameters communicated to it by the source SRNC during the relocation procedure and/or calculation parameters chosen by the target SRNC, which can be included in the integrity protection mode info IE of the RRC information unit created in step 20'. Additional information relating to the MAC-I code calculated by the target SRNC can be transferred from the target SRNC to the source SRNC in various ways, for example in or with an information unit such as, in this example:

an RRC information target RNS to source RNC information unit, an RRC information container, a target SRNC to source SRNC transparent information container, or a RANAP message.

Additional information containing the MAC-I code calculated by the target SRNC can therefore be provided, for example in or with the RRC information created by the target SRNC, in the RRC information container containing the RRC information, or directly in the RANAP message sent from the source SRNC to the CN.

For example:

an additional IE can be provided in the RRC information target RNC to source RNC information unit, corresponding in this example to the message authentication code IE, (to use the usual notation for coding techniques such as the ASN.1 technique) an extension marker can be provided at a corresponding location in the RRC information target RNC to source RNC sequence (in the case of a receiver that does not use this protocol version), (to use the usual notation for coding techniques such as the ASN.1 technique) an extension marker can be provided at a corresponding location in the RRC container sequence (in the case of a receiver that does not use this protocol version), or (to use the usual notation for coding techniques such as the ASN.1 technique) an extension marker can be provided at a corresponding location in the target RNC to source RNC sequence transparent container (in the case of a receiver that does not use this protocol version).

For example, an extension of the target RNC to source RNC transparent container IE of the RANAP container could be defined containing a container defined in the RRC information to which the additional information would be added.

In a step 30' the target SRNC sends the CN a RANAP message such as the RELOCATION REQUEST ACKNOWLEDGE message. This message differs from that sent in step 30 in FIG. 3 in that it includes additional information corresponding to the MAC-I code calculated by the target controller; this additional information, which is denoted "Relocation request acknowledge (target RNC to source RNC transparent container)+MAC-I" in FIG. 4, can be transferred to the source SRNC in one of the ways indicated above, for example.

In a step 40' the CN sends the source SRNC a RANAP message such as the RELOCATION COMMAND message. This message differs from that sent in step 40 in FIG. 3 in that it includes additional information corresponding to the MAC-I code calculated by the target controller; this additional information, which is denoted "Relocation command (target RNC to source RNC transparent container)+MAC-I" in FIG. 4, can be transferred to the source SRNC in one of the ways indicated above, for example.

In a step 50' the source SRNC constructs the RRC message to be sent to the UE at the Uu interface. In this step, unlike step 50 in FIG. 3, no processing is required that corresponds to calculating the MAC-I code and decoding the RRC information unit received, prior to such calculation, which in particular avoids the drawbacks previously mentioned.

In a step 60' the source SRNC sends the UE an RRC message obtained in this way.

Other aspects of the invention, described next, provide solutions to the following problems noted by the applicant.

A first problem can be stated in the following terms. As previously explained, the SRNC must compose the RRC message to be sent to the UE at the Uu interface, in particular from the RRC information sequence that it receives from the target SRNC. The message composed in this way must have a size corresponding to a multiple of eight bits. In order to send the RRC message at the Uu interface, the source SRNC must then add RRC padding bits to the end of the message composed in this way. The amount of padding to be added depends on the size of the RRC information, target RNC to source RNC sequence received from the target SRNC. Because the SRNC container containing this sequence also contains container padding, as previously indicated, it is obviously necessary for the source SRNC to decode the sequence to determine its size. If the objective is still to avoid the source SRNC having to decode the RRC information sequence received, other solutions must be found. It should be noted that this first problem can be considered independently of the problem previously stated.

In one example of a solution to this first problem, the target SRNC sends the source SRNC additional information to enable the source SRNC to determine the size of the RRC information, target RNC to source RNC sequence. For example, the additional information can consist of information relating to the size of the RRC information, target RNC to source RNC sequence itself, the amount of container padding added by the target SRNC to the RRC container, the size of the target RNC to source RNC transparent container sequence, etc.

In another example of a solution to the first problem, the target SRNC determines the amount of RRC padding required to send the RRC message at the Uu interface (the target SRNC must determine this amount when it calculates the MAC-I code, since one input parameter of the integrity algorithm is the MESSAGE parameter, as previously indicated). The target SRNC then provides sufficient container padding for the source SRNC to be able to use the RRC container sequence as it stands, if necessary removing only container padding bits to obtain the required length for the RRC message sequence, which avoids having to calculate the number of padding bits, unlike the situation in which it would be necessary to add padding bits.

Other examples would be feasible, of course.

A second problem can be stated in the following terms. As previously indicated, the identity of the radio bearer (RB) used to send a RRC message at the Uu interface is one of the MAC-I code calculation parameters. The MAC-I code calculated therefore differs as a function of the RB on which the message is sent. The target SRNC may choose an RB different from that indicated by the source SRNC in a previous step. Solutions must therefore also be found so that the MAC-I code calculated by the target SRNC can be validly used by the source SRNC.

In one example of a solution to this second problem, the target SRNC calculates a MAC-I code for each eligible RB on which the message might be sent and transmits the MAC-I codes calculated with the corresponding RB Id to the source SRNC.

In another example of a solution to the second problem, the target SRNC indicates to the source SRNC the RB Id for which the MAC-I code has been calculated and on which the message must be sent.

The present invention also proposes that, to calculate the MAC-I code, the target SRNC use the RB Id indicated to it by the source SRNC and which corresponds to the RB Id on which the source SRNC will send the RRC message. The present invention also proposes that this RB Id be indicated by the source SRNC to the target SRNC in a RRC information unit called the SRNS relocation information unit transferred from the source SRNC to the target SRNC via the core network during the relocation procedure. RANAP messages such as RELOCATION REQUIRED (sent between the source SRNC and the CN) and RELOCATION REQUEST (sent between the CN and the target SRNC) contain an IE corresponding to an information container called the source RNC to target RNC transparent container, which in turn contains an IE corresponding to an information container called the RRC container, which itself contains the SRNS relocation information unit.

For example:
an additional IE can be provided in the SRNS relocation information unit, corresponding in this example to the RB Id IE, and
(to use the usual notation for coding techniques such as the ASN.1 technique) an extension marker can be provided at a corresponding location in the corresponding coded sequence, which is denoted "SRNS relocation information" (in the case of a receiver that does not use this protocol version).

Other examples would be feasible, of course.

A third problem can be stated in the following terms. As previously indicated, the RRC SN sequence number is one of the parameters for calculating the MAC-I code. The MAC-I code calculated therefore differs as a function of the RRC SN sequence number of the message sent. The target SRNC may choose a different RRC SN from that chosen by the source SRNC. Solutions must therefore also be found so that the MAC-I code calculated by the target SRNC can be validly used by the source SRNC.

In one example of a solution to this third problem, the target SRNC calculates a MAC-I code for each eligible RRC SN on which the message might be sent and sends the calculated MAC-I codes with the corresponding RRC SN to the source SRNC.

In another example of a solution to the third problem, the target SRNC indicates to the source SRNC the RRC SN for which the MAC-I code was calculated and which must be sent in the RRC message to the mobile terminal at the Uu interface.

Other examples would of course be feasible.

FIG. 5 shows another example of a method according to the invention, which differs from that shown in FIG. 4 in that there is provision for transferring from the target controller to the source controller further additional information, over and above the additional information relating to the MAC-I code calculated. In this example the further additional information includes:
additional information to enable the source SRNC to determine the size of the RRC information, target RNC to source RNC sequence, in this instance additional information denoted "Amount of padding" relating to the amount of padding added by the target controller to a RRC information sequence in order to transfer it into an RRC container,
additional information, denoted "RB Id", for matching the code calculated by the target controller to the identity of the radio bearer used to send said message to the mobile terminal, and
additional information, denoted "RRC SN", to match a sequence number contained in the message sent to the mobile terminal to the sequence number used by the target controller to calculate said code.

Other additional information of the above kind is intended to ensure that operations of constructing messages by the source controller and of calculating codes by the target controller are mutually consistent.

FIG. 5 shows method steps 10", 20", 30", 40", 60".

The step 10" can be similar to the step 10'.

The step 20" can be similar to the step 20', except that it can include additional steps for communicating to the source SRNC supplementary additional information denoted "Amount of padding", "RB Id", "RRC SN", over and above the additional information MAC-I.

Such supplementary additional information, for example that denoted "Amount of padding", "RB Id", "RRC SN", can be transferred from the target SRNC to the source SRNC in various ways, for example in any of the ways previously indicated for transferring additional information relating to the MAC-I code.

For example:
- an additional IE can be provided in the RRC information target RNC to source RNC information unit, corresponding in this example to the following IE: "Message Authentication Code", "Amount of padding", "RB Id", "RRC SN",
- (to use the usual notation for coding techniques such as the ASN.1 technique) an extension marker can be provided at a corresponding location in the RRC information target RNC to source RNC sequence (for a receiver not using this protocol version),
- (to use the usual notation for coding techniques such as the ASN.1 technique) an extension marker can be provided at a corresponding location in the RRC container sequence (for a receiver not using this protocol version), and
- (to use the usual notation for coding techniques such as the ASN.1 technique) an extension marker can be provided at a corresponding location in the target RNC to source RNC transparent container sequence (for a receiver not using this protocol version).

For example, an extension of the Target SRNC to source SRNC transparent container IE of the RANAP container could be defined containing a container defined in the RRC information and to which the additional information would be added.

In the step 30" the target SRNC sends the CN a RANAP message such as the RELOCATION REQUEST ACKNOWLEDGE message. This message differs from that sent in step 30 in FIG. 3 in that it includes additional information corresponding to the MAC-I code, the amount of padding, the RB Id, and the RRC SN, and which in FIG. 5 is denoted "Relocation request acknowledge (target RNC to source RNC transparent container)+MAC-I+amount of padding+RB ID+RRB SN"; the additional information can be transferred to the source SRNC in any of the ways previously indicated, for example.

In the step 40" the CN sends the source SRNS a RANAP message such as the RELOCATION COMMAND message. This message differs from that sent in step 40 in FIG. 3 in that it includes additional information corresponding to the MAC-I code, the amount of padding, the RB Id, and the RRC SN, and which in FIG. 5 is denoted "Relocation command (target RNC to source RNC transparent container)+MAC-I+ amount of padding+RB ID+RRB SN"; the additional information can be transferred to the source SRNC in any of the ways previously indicated, for example.

The step 50" can include, in addition to the processing effected in the step 50', processing to take account of the supplementary additional information Amount of padding, RB Id, RRC SN previously described in the construction of the message by the source SRNC.

The step 60" can be similar to the step 60'.

The FIG. 5 example combines the solutions to the various problems previously stated, but it would of course be feasible to address them separately or by way of partial combinations.

The invention is not limited to the examples described above with reference to FIGS. 4 and 5, of course. In particular, the invention is not limited to:
- RRC messages sent to the UE in the event of a relocation in which the UE is involved,
- the situation in which the parameters to be used by the UE (such as the MAC-I calculation parameters) change in the event of a change of server radio access network controller,
- the examples described above of information and/or structures for the transfer of information, or
- the UMTS.

The present invention also provides, in addition to a method as defined hereinabove, an access radio network controller, a mobile terminal, and a mobile radio system all including means for implementing the method.

Because the specific implementation of the above means will represent no particular difficulty for the person skilled in the art, they do not need to be described in more detail here than as above, by stating their function.

What is claimed is:

1. A method of protecting the integrity of messages sent between a mobile terminal and a server radio access network controller in a mobile radio system, the method comprising, in the event of a change of server radio access network controller from a source controller to a target controller, sending a message protected by a code calculated in the target controller to the mobile terminal by the source controller, for forwarding to the mobile terminal information created in the target controller and then transferred by the target controller to the source controller.

2. A method according to claim 1, wherein additional information is created in the target controller and then transferred from the target controller to the source controller.

3. A method according to claim 2, wherein said additional information includes additional information relating to the code calculated by the target controller.

4. A method according to claim 2, wherein said additional information includes additional information intended to ensure that operations of message construction by the source controller and of code calculation by the target controller are mutually consistent.

5. A method according to claim 4, wherein said additional information includes additional information intended to enable the source controller to determine the size of a sequence of bits received from the target controller and corresponding to said information created by the target controller.

6. A method according to claim 5, wherein said additional information indicates the amount of padding needed to transfer said sequence of bits in an information container of given size.

7. A method according to claim 4, wherein said additional information includes additional information intended to ensure that the identity of the radio bearer used by the target controller to calculate said code matches the identity of the radio bearer used by the source controller to send said message to the mobile terminal.

8. A method according to claim 4, wherein said additional information includes additional information intended to ensure that a sequence number contained in the message sent to the mobile terminal matches the sequence number used by the target controller to calculate said code.

9. A method according to claim 2, wherein said additional information is transferred from the target controller to the source controller in the same information unit as said information created by the target controller.

10. A method according to claim 2, wherein said additional information is transferred from the target controller to the source controller in a first information container including said information unit.

11. A method according to claim 2, wherein said additional information is transferred from the target controller to the source controller in a second information container including said first information container.

12. A method according to claim 2, wherein said additional information is transferred from the target controller to the source controller in a message sent between the target controller and the core network and then in a message sent between the core network and the source controller, said messages including said second information container.

13. A method according to claim 1, wherein said message sent from the source controller to the mobile terminal is a radio resource control (RRC) message.

14. A method according to claim 9, wherein said information unit is an RRC information, target RNC to source RNC information unit.

15. A method according to claim 10, wherein said first information container is an RRC information container.

16. A method according to claim 11, wherein said second information container is a target RNC to source RNC transparent information container.

17. A method according to claim 12, wherein said messages including said second information container are radio access network application part (RANAP) messages.

18. A method according to claim 1, wherein said information communicates to the mobile terminal parameters to be used under the control of the target controller.

19. A method according to claim 1, wherein said RRC message is one of the following messages: RADIO BEARER SETUP, RADIO BEAR RECONFIGURATION, RADIO BEARER RELEASE, TRANSPORT CHANNEL RECONFIGURATION, PHYSICAL CHANNEL RECONFIGURATION.

20. A method according to claim 1, wherein said RANAP message sent between the target controller and the core network is a RELOCATION REQUEST ACKNOWLEDGE message.

21. A method according to claim 1, wherein said RANAP message sent between the core network and the source controller is a RELOCATION COMMAND message.

22. A method according to claim 1, wherein said code is a MAC-I message authentication code.

23. A method according to claim 1, wherein, in the event of change of server radio access network controller from said source controller to said target controller, information created in the source controller is transferred to the target controller and additional information is created in the source controller and then transferred from the source controller to the target controller.

24. A method according to claim 23, wherein said additional information created in the source controller includes additional information to ensure that the identity of the radio bearer used by the target controller to calculate said code matches the identity of the radio bearer used by the source controller to send said message to the mobile terminal.

25. A method according to claim 23, wherein said additional information is transferred from the source controller to the target controller in the same information unit as said information created by the source controller.

26. A method according to claim 23, wherein said additional information is transferred from the source controller to the target controller in a first information container including said information unit.

27. A method according to claim 23, wherein said additional information is transferred from the source controller to the target controller in a second information container including said first information container.

28. A method according to claim 23, wherein said additional information is transferred from the source controller to the target controller in a message sent from the source controller to the core network and then in a message sent from the core network to the target controller, said messages including said second information container.

29. A method according to claim 9, wherein said information unit is an SRNS relocation information unit.

30. A method according to claim 26, wherein said first information container is an RRC container.

31. A method according to claim 27, wherein said second information container is a source RNC to target RNC transparent container.

32. A method according to claim 28, wherein said messages including said second information container are radio access network application part (RANAP) messages.

33. A method according to claim 32, wherein said RANAP message sent between the source controller and the core network is a RELOCATION REQUIRED message.

34. A method according to claim 32, wherein said RANAP message sent between the core network and the target controller is a RELOCATION REQUEST message.

35. A radio access network controller for use in a mobile radio system, the radio access network controller being configured to, in the event of a change of server radio access network controller from the radio access network controller being a source controller to a target controller, send to a mobile terminal a message protected by a code calculated in the target controller, for forwarding to the mobile terminal information created in the target controller and then transferred by the target controller to the radio access network controller.

36. A mobile radio system comprising:
a mobile terminal;
a source server radio access network controller;
a target server radio access network controller, wherein in the event of a change of server radio access network controller from the source server radio access network controller to the target server radio access network controller, a message protected by a code calculated in the target server radio access network controller is sent to the mobile terminal by the source server radio access network controller, for forwarding to the mobile terminal information created in the target server radio access network controller and then transferred by the target server radio access network controller to the source server radio access network controller.

37. A radio network controller configured to operate as a target radio network controller in the event of a relocation of a server radio network controller from a source radio network controller to the target radio network controller, said radio network controller comprising means for calculating a code for protecting an integrity of a message to be sent to a user equipment by the source radio network controller in the case of relocation where the user equipment is involved.

38. A radio network controller configured to operate as a source radio network controller in the event of a relocation of a server radio network controller from the source radio network controller to the target radio network controller, said radio network controller comprising means for sending a message protected by a code calculated in the target radio network controller to a user equipment and indicating to the target radio network controller a Radio Bearer Identity (RB Id) on which the source radio network controller must transmit a Radio Resource Control (RRC) message in the case of relocation where the user equipment is involved.

* * * * *